(12) United States Patent
Kim et al.

(10) Patent No.: US 8,786,851 B2
(45) Date of Patent: Jul. 22, 2014

(54) SYSTEM FOR TESTING DISTORTION OF LIQUID CRYSTAL DISPLAY DEVICE

(75) Inventors: Gi-Bin Kim, Paju (KR); Tae-Woo Kim, Dongpae-Ri (KR); Na-Young Ha, Seoul (KR)

(73) Assignee: LG Display Co., Ltd., Seoul (KR)

( * ) Notice: Subject to any disclaimer, the term of this patent is extended or adjusted under 35 U.S.C. 154(b) by 336 days.

(21) Appl. No.: 12/649,862

(22) Filed: Dec. 30, 2009

(65) Prior Publication Data

US 2010/0165360 A1  Jul. 1, 2010

(30) Foreign Application Priority Data

Dec. 31, 2008 (KR) .......................... 10-2008-0138664

(51) Int. Cl.
 *G01N 21/00* (2006.01)
(52) U.S. Cl.
 USPC .................. 356/239.1; 356/237.1; 356/237.6; 356/615
(58) Field of Classification Search
 USPC ..................................... 356/615, 237.1–237.6
 See application file for complete search history.

(56) References Cited

U.S. PATENT DOCUMENTS

| | | | | |
|---|---|---|---|---|
| 4,541,011 A | * | 9/1985 | Mayer et al. | 348/133 |
| 6,222,629 B1 | * | 4/2001 | Morris | 356/601 |
| 6,256,091 B1 | * | 7/2001 | Kobayashi | 356/237.1 |
| 6,396,579 B1 | * | 5/2002 | Hayamizu et al. | 356/239.7 |
| 7,166,856 B2 | * | 1/2007 | Cho et al. | 250/559.45 |
| 8,160,351 B2 | * | 4/2012 | Sandstrom et al. | 382/149 |
| 2002/0025375 A1 | * | 2/2002 | Takamori et al. | 427/240 |
| 2004/0070753 A1 | * | 4/2004 | Sugihara et al. | 356/237.5 |
| 2007/0259290 A1 | * | 11/2007 | Okita | 430/312 |
| 2008/0110205 A1 | * | 5/2008 | Adriaansen et al. | 65/29.12 |

FOREIGN PATENT DOCUMENTS

KR  1020070121820 A  12/2007

OTHER PUBLICATIONS

Office Action issued in corresponding Korean Patent Application No. 10-2008-0138664, mailed Dec. 21, 2012.

* cited by examiner

*Primary Examiner* — Tarifur Chowdhury
*Assistant Examiner* — Isiaka Akanbi
(74) *Attorney, Agent, or Firm* — Brinks Gilson & Lione

(57) ABSTRACT

A system for testing a distortion of a liquid crystal display (LCD) device can test the LCD device within a chamber in a state of being assembled perpendicular to the ground, whereby whether any distortion occurs in an internal component can be fast detected even in severe conditions of high temperature and high humidity and under an actual installation environment of a user.

6 Claims, 5 Drawing Sheets

SYSTEM FOR TESTING DISTORTION OF LIQUID CRYSTAL DISPLAY DEVICE

This application claims the benefit of Korea Patent Application No. 10-2008-0138664, filed on Dec. 31, 2008, the entire contents of which is incorporated herein by reference for all purposes as if fully set forth herein.

BACKGROUND

1. Field of the Invention

The present disclosure relates to a system for testing a distortion of a liquid crystal display device, and particularly, to a system for testing a distortion of a liquid crystal display device capable of testing distortion of each component of the liquid crystal display in an assembled state under an actual installation condition of a user.

2. Discussion of the Related Art

Recently, the development of various types of portable electric equipment, such as mobile phones, personal digital assistants (PDAs), and note book computers, is increasing the demands on flat panel display devices which are applicable to those equipment and small in size, light in weight and power-efficient. Examples of the flat panel display device are a liquid crystal display (LCD) device, a plasma display panel (PDP) device, a field emission display (FED) device, a vacuum fluorescent display (VFD) device and the like. Studies on those devices are actively conducted. Among others, the LCD device is currently in the limelight in view of its mass production technology, ease of driving scheme and implementation of high definition.

An LCD device represents information on a screen by use of refractive index anisotropy of liquid crystal. As shown in FIG. 1, an LCD device 1 is provided with a lower substrate 5, an upper substrate 3 and a liquid crystal layer 7 interposed between the lower and upper substrates 5 and 3. The lower substrate 5 is a driving element array substrate. Although not shown, the lower substrate 5 has a plurality of pixels, each of which is provided with a driving element such as a thin film transistor (TFT). The upper substrate 3 is a color filter substrate which has color filter layers for representing actual colors. Also, the lower substrate 5 and the upper substrate 3 are respectively provided with pixel electrodes and common electrodes, and alignment layers for aligning liquid crystal molecules of the liquid crystal layer 7 are coated on the lower and upper substrates 5 and 3.

The lower and upper substrates 5 and 3 are attached to each other by a sealant 9. The liquid crystal layer 7 is interposed therebetween so as to drive the liquid crystal molecules by means of the driving elements formed on the lower substrate 5, thereby controlling the light amount transmitted therethrough, ending up with representation of information.

A fabrication process for the LCD device is divided into a driving element array substrate process of forming driving elements on the lower substrate 5, a color filter substrate process of forming color filter layers on the upper substrate 3, and a cell process, which will be described in conjunction with FIG. 2.

First, a plurality of gate lines and data lines which are arranged on the lower substrates to define a plurality of pixel regions are formed through the driving element array process, and TFTs which are driving elements connected to the gate lines and data lines are formed on each of the pixel regions (S101). Pixel electrodes which are connected to the corresponding TFTs are formed through the driving element array process so as to drive the liquid crystal layer 7 when a signal is applied via the TFTs.

R, G and B color filter layers for representing colors and common electrodes are formed on the upper substrate 3 through the color filter process (S104).

Afterwards, alignment layers are coated on each of the lower substrate 5 and the upper substrate 3. A rubbing process of the alignment layers is followed to provide an anchoring force or a surface adhesive force (i.e., pretilt angle and an alignment direction) to the liquid crystal molecules of the liquid crystal layer 7 formed between the upper substrate 3 and the lower substrate 5 (S102 and S105). Then, a spacer is dispersed on the lower substrate 5 to keep cell gaps constantly, and the sealant 9 is applied to the outer circumference of the upper substrate 3. The lower substrate 5 and the upper substrate 3 are then pressed to be attached to each other (S103, S106 and S107).

The upper and lower substrates 5 and 3 are configured as large glass substrates. That is, a plurality of panel regions are defined on a large glass substrate and the TFT as a driving element and a color filter layer are formed on each panel region. Accordingly, in order to fabricate an individual liquid crystal panel, the glass substrate should undergo cutting and processing processes (S108). Afterwards, liquid crystal is injected into each liquid crystal panel through liquid crystal inlets and the inlets are encapsulated to form a liquid crystal layer. Each liquid crystal panel is tested to complete the liquid crystal panel fabrication (S109 ad S110).

The testing for a liquid crystal panel may be divided into an appearance test, an electrical lighting test, a gravity defect test and a distortion test of the liquid crystal panel and internal components. The lighting test is to determine whether various electric elements are normally operated by applying a signal to each completed liquid crystal panel. The appearance test is to determine whether there is any defect in the liquid crystal panel by examining the liquid crystal panel with the naked eye. The gravity defect test is to determine whether liquid crystal is gathered to a lower portion of the liquid crystal panel due to gravity.

The distortion test of internal components is to inspect the distortion of the liquid crystal panel and the internal components, such as an optical sheet or a diffusion plate, so as to determine whether there is any fault due to the distortion of the internal components. In particular, the distortion test for internal components is carried out under a high temperature and high humid environment, which means the reliability of the LCD device is inspected under severe conditions.

The distortion test three-dimensionally measures a distortion by use of contact type and non-contact type three-dimensional coordinate measuring machines. However, the related art distortion test has the following problems.

First, in order to use the related art three-dimensional coordinate measuring machine, an LCD device should be disassembled so that the distortion of the disassembled components is inspected. However, in this case, such distortion of the internal components cannot be detected in an actually assembled state. Furthermore, a long time is spent to disassemble the LCD device, which causes the requirement of a long time for testing and the increase in cost.

Second, the testing (inspection) is not available under a severe environment. In order to carry out the distortion test for the LCD device under a high temperature and high humidity environment, the high temperature and high humidity environment is first established within a chamber and then the distortion test is possible to be executed. However, the related art three-dimensional coordinate measuring machine is large in size, so it is substantially impossible to carry out the test within the chamber. Hence, after leaving the LCD device within the chamber under a severe environment for a preset time, the LCD device is taken out of the chamber in order to perform the distortion test therefor. Therefore, the testing under the severe environment is substantially impossible to be performed.

Third, the testing is impossible under an actual installation environment of the LCD device. The testing by use of the related art three-dimensional coordinate measuring machine is conducted in a state where a table is disposed at a level with the ground and the LCD device is loaded on the table. Accordingly, since it is different from a condition that the LCD device is actually installed in a user environment (i.e., a condition that the LCD device is disposed horizontal to the ground), a distortion which may occur in the installation environment cannot be detected.

BRIEF SUMMARY

A system for testing a distortion of a liquid crystal display (LCD) device includes a fixing unit for fixing the LCD device perpendicular to the ground, a laser sensor at a front side or rear side of the LCD device or irradiating light to the LCD device to measure a displacement of an internal component thereof, a conveyer at a front side or rear side of the LCD device to convey the laser sensor in horizontal and vertical directions, and a controller for detecting a position of an internal component of the LCD device based upon information input by the laser sensor, and comparing the detected position with a preset position of the corresponding internal component to determine a distortion of the component.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Description will now be given in detail of the present invention, with reference to the accompanying drawings.

Figure 1:
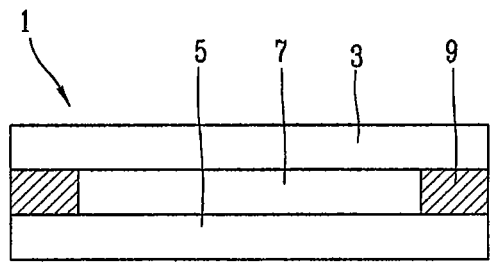
FIG. 1 is a cross-sectional view showing a structure of a typical liquid crystal display (LCD) device.
Figure 2:
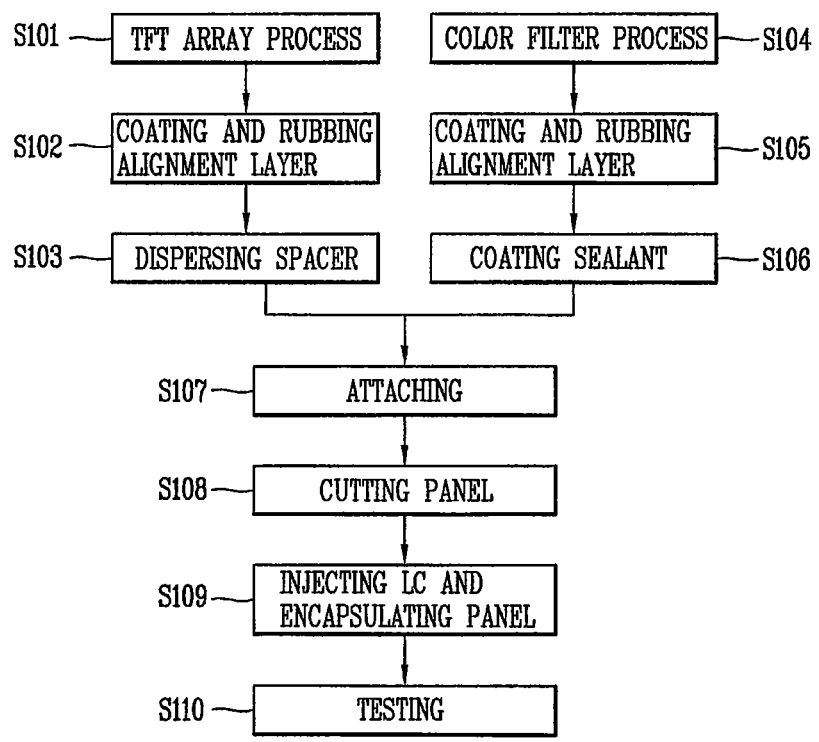
FIG. 2 is a flowchart showing a fabrication method for the typical LCD device.
Figure 3:
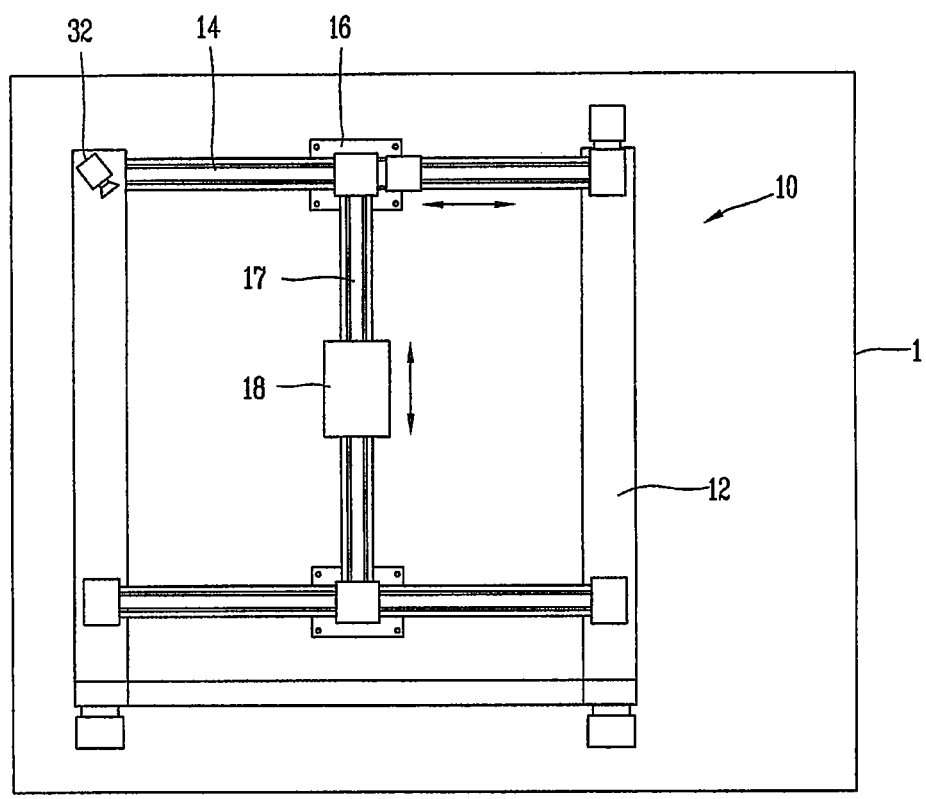
FIG. 3 is a view showing a structure of a system for testing a distortion of an LCD device in accordance with the present disclosure.
Figure 4:
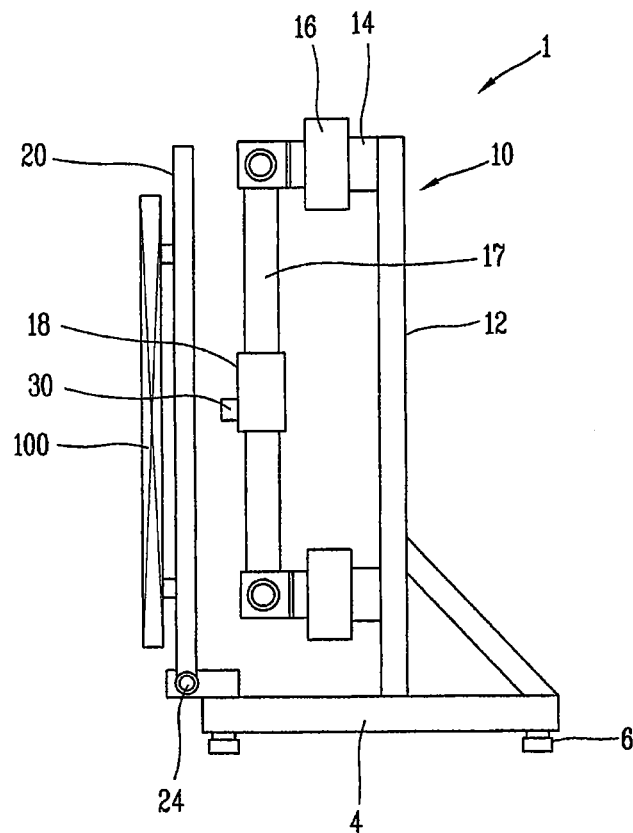
FIG. 4 is a view showing a structure of a measuring unit of the system for testing a distortion of the LCD device in accordance with the present disclosure.

FIGS. 3 and 4 show a structure of an apparatus for testing a distortion in a distortion testing system for an LCD device in accordance with the present disclosure.

As shown in FIGS. 3 and 4, an apparatus for testing a distortion according to the present invention may include a fixing unit to which an LCD device 100 is fixed, and a measuring unit for measuring a distortion of the fixed LCD device 100. Here, the fixing unit and the measuring unit is installed on a base 4 and the apparatus for testing a distortion may be installed within a chamber 11 in which a testing condition is adjustable.

The fixing unit may include a fixing frame 20 for fixing the LCD device 100, and a fixing frame angle adjusting unit 24 located at a lower portion of the fixing frame 20 for adjusting an angle of the fixing frame 20. The fixing frame 20 is typically installed almost perpendicular to the ground, so the LCD device 100 is also fixed almost perpendicular to the ground, similar to actually using the LCD device 100.

The angle adjusting unit 24 is adopted to adjust an installation angle of the fixing frame 20 for fixing the LCD device 100. In general, the LCD device 100 may be installed in various angles depending on an installation environment thereof. Therefore, in order to carry out the distortion test for internal components in various installation environments, the present invention adjusts an angle of the fixing frame 20 so as to execute the distortion test for the LCD device 100 at various installation angles. Although not shown, the angle adjusting unit 24 may be provided with a stopper to suspend the fixing frame 20 such that the fixing frame 20 retains a preset angle.

The fixing frame angle adjusting unit 24 may be manually operated by an operator to adjust the angle of the fixing frame 20. Alternatively, it may automatically adjust the angle. Although not shown, the fixing frame angle adjusting unit 24 may be provided with a step motor, which automatically drives the angle adjusting unit 24 to a preset angle, thereby adjusting the angle of the fixing frame 20.

The measuring unit may include a frame 12, first guides 14 and second guides 17 both installed at the frame 12, first linear guides 16 and a second linear guide 18 moving along the first and second guides 14 and 17, respectively, and a laser sensor 30 installed at the second linear guide 18 for measuring a displacement of the LCD device 100 fixed to the fixing unit.

Referring to FIG. 4, the first guides 14 may be installed in pair at upper and lower portions of the frame 12 in a horizontal direction, and the first linear guides 16 are installed at the pair of first guides 14, respectively, to be moved along the corresponding first guides 14. The second guide 17 may be vertically disposed at the pair of first linear guides 16 installed at the first guides 14. Accordingly, the entire second guide 17 moves in a horizontal direction when the first linear guides 16 move. The second linear guide 18 may be installed at the second guide 17 so as to move in the vertical direction along the second guide 17. Also, a laser sensor 30 may be installed at the second linear guide 16.

A bottom portion is located at a lower side of the fixing unit and the measuring unit so as to support the fixing frame 20 of the fixing unit and the frame 12 of the measuring unit. A CCD camera 32 is installed at a corner of the frame 12 of the measuring unit to detect a moved state of each of the first and second linear guides 16 and 18 and the laser sensor 30.

With the configuration of the apparatus for testing a distortion, when the LCD device 100 is fixed to the fixing frame 20 of the fixing unit, the LCD device 100 is disposed at a desired angle by the fixing frame angle adjusting unit 24. Under this state, when the first linear guides 16 installed at the first guides 14 move, the second guide 17 in turn moves in a vertical direction. Simultaneously, as the second linear guide 18 installed at the second guide 17 moves in the vertical direction, the laser sensor 30 installed at the second linear guide 18 moves in horizontal and vertical directions so as to be located at a desired position.

Figure 5:
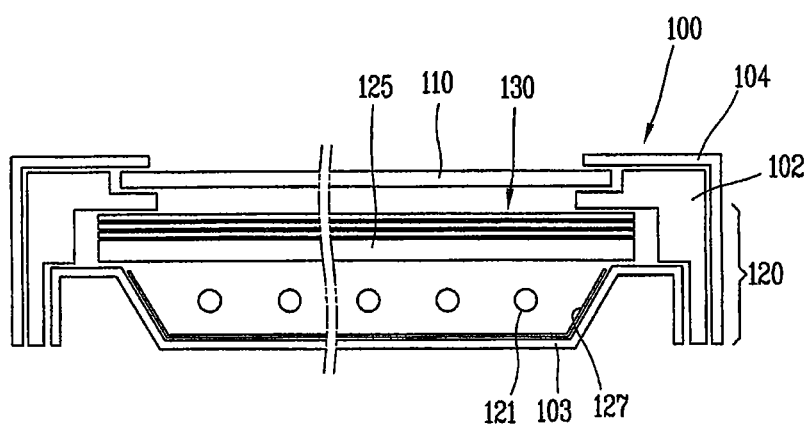
FIG. 5 is a view showing a structure of an LCD device in accordance with the present disclosure.

Referring to FIG. 5, the LCD device 100 may broadly include a liquid crystal display (LCD) panel 110 and a backlight 120 installed at a rear side of the LCD panel 110. Although not shown, the LCD panel 110 is provided with upper and lower substrates formed of glass, for example, and a liquid crystal layer formed therebetween, thereby implementing actual image. Especially, the lower substrate is a thin film transistor (TFT) substrate provided with driving elements, such as TFTs, and pixel electrodes, while the upper substrate is a color filter substrate provided with color filter layers.

The backlight 120 may include lamps 121 for emitting actual light, a reflector 127 for reflecting light emitted from the lamps 121 so as to improve light efficiency, a diffuser 125 for diffusing light emitted from the lamps 121, and an optical sheet 130 disposed at an upper side of the diffuser 125 for diffusing light emitted from the diffuser 125 once again and condensing such light so as to supply light with enhanced brightness and uniformity.

The LCD panel 110 and the backlight 120 may be fixed to a main supporting unit 102, respectively, and then assembled to each other by use of a lower cover 103 and an upper cover 104.

Targets to be tested (inspected, examined) by the apparatus for testing a distortion, among components of the LCD device 100, may be components disposed inside the LCD device 100, such as the diffuser 125 and the optical sheet 130. However, the diffuser 125 and the optical sheet 130 are disposed between the LCD panel 110 and the lower cover 103, so they may be externally invisible.

Figure 6A:
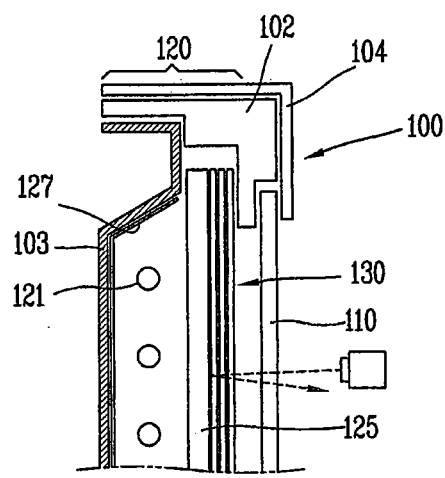
FIG. 6A is view showing a method for testing a distortion of an LCD device using a transmission type laser sensor.

Therefore, the present invention carries out the testing (inspection, examination) by employing a transmission type laser sensor as the laser sensor 30 or forming a window through which the inside of the LCD device is visible. The transmission type laser sensor uses infrared rays. Referring to FIG. 6A, if infrared rays are irradiated from the laser sensor 30 onto the LCD panel 110, in a state where the laser sensor 30 is located outside the LCD panel 110 disposed within a chamber 11 (not shown in this drawing), with changing temperature and humidity of the inside of the chamber 11, the infrared rays are transmitted through the LCD panel 110 and reflected on the optical sheet 130 or the diffuser 125, thereby being incident back onto the laser sensor 30. Here, the laser sensor 30 moves responsive to the movement of the first linear guides 16 and the second linear guide 18, so as to irradiate infrared rays with scanning the entire LCD device 100.

In the meantime, the laser sensor 30 may detect the distortion of each component located within the LCD device 100 by being located behind the LCD device 100 other than in front thereof. Here, the LCD device 100 may be fixed to the fixing frame 20 of the fixing unit such that the lower cover 103 faces the laser sensor 30.

Figure 6B:
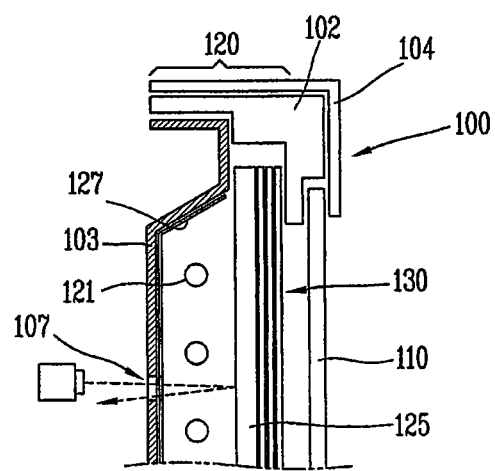
FIG. 6B is a view showing a method for testing a distortion of an LCD device using a non-transmission type laser sensor.

Alternatively, the laser sensor 30 may be configured as a non-transmission type laser sensor. In this case, referring to FIG. 6B, a window 107 is formed through the lower cover 103 so that a laser can irradiate light inwardly. Accordingly, light reflected by internal components is received so as to detect distortion of the components. Here, the window 107 may be formed on the lower cover 103, the diffuser 125 or the like, depending on the type of components to which light is irradiated by the laser sensor 30.

As such, a current position of an internal component may be detected by the light which is irradiated from the laser sensor 30, reflected by the internal component and then incident back onto the laser sensor 30. Accordingly, whether a distortion is found on the component is determined by the detected current position of the component. The detection of the position and the determination of the distortion may be executed by a controller.

Figure 7:
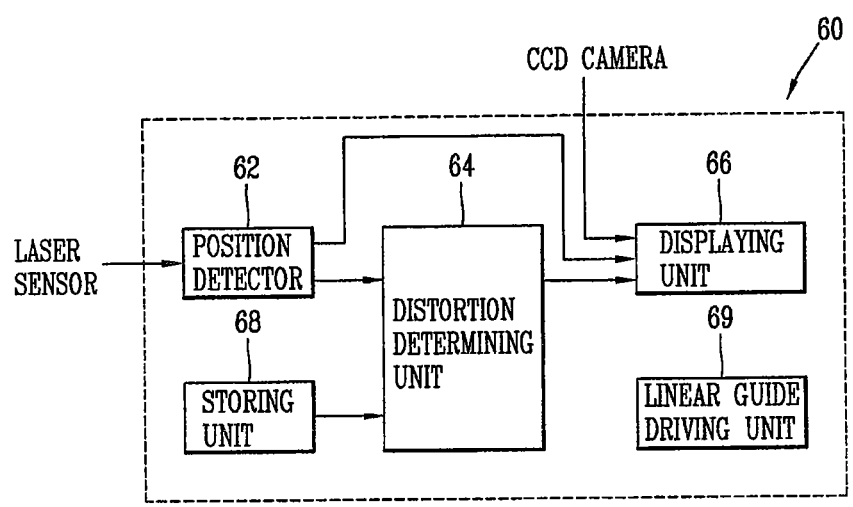
FIG. 7 is a block diagram showing a structure of a controller in accordance with the present disclosure.

A controller is shown in FIG. 7. As shown in FIG. 7, a controller 60 may include a position detector 62 for detecting a position of a component measured based upon a measurement value when the measurement value is input by the laser sensor 30, a distortion determining unit 64 for comparing the position detected by the position detector 62 with a stored preset position of the corresponding component, calculating the difference value, and determining a distortion of the component when the difference value exceeds a limit value, a displaying unit 66 for displaying the position of the component detected by the position detector 62 and the degree of the distortion of the component determined by the distortion determining unit 64, a storing unit 68 for storing various information such as the preset position of the component and the like, and a linear guide driving unit 69 for driving the first and second linear guides 16 and 18 so as to move the laser sensor 30 to a desired position.

The position detector 62 may detect a time taken while light is emitted from the laser sensor 30, reflected on the corresponding component and incident back onto the laser sensor 30, thereby detecting the present position of the component. The position detection of the component may be carried out in real time while the laser sensor 30 scans the LCD device 100, so as to detect the overall position of the component. The overall position of the component is displayed on the displaying unit 66.

The distortion determining unit 64 compares the detected overall position of the component with the preset position stored in the storing unit 68, thereby calculating the difference value therebetween. The distortion determining unit 64 then compares the calculated difference value with a preset value stored in the storing unit 68. If the calculated difference value is smaller than the preset value, the distortion determining unit 64 determines that the degree of the distortion of the component is not severe, so as to decide that such distortion may not occur a problem of degrading an image quality of the LCD device, for example. Also, if the calculated difference value is greater than the preset value, the distortion determining unit 64 determines that the distortion of the component may degrade the image quality of the LCD device 100, and accordingly decides the defect of the corresponding LCD device 100. Hence, the result of the determination as to whether the LCD device 100 is certified or defective is then displayed on the displaying unit 66, to thereby notify the operator.

Furthermore, the displaying unit 66 displays information input from the CCD camera 32 installed at the corner of the frame 12, thereby allowing the operator to recognize the present condition of the testing for the LCD device 100.

As described above, in the present invention, after disposing an LCD device perpendicular to the ground within a chamber in which testing conditions are adjustable, a laser sensor can be employed to determine whether there is any distortion detected on internal components of the LCD device in an assembled state.

Here, the detailed description illustrates a specific structure of each component of the present invention for the sake of explanation, but the present invention may not be limited to the specific structures. For instance, the guides and linear guides are installed for moving the laser sensor in the detailed description; however, the present invention may not be limited to the configuration. Alternatively, any configuration, for example, gears or guide rails, may be applicable as long as a laser sensor can be moved all over the LCD device. Also, the scheme of fixing the LCD device by use of the fixing unit is implemented in a specific structure, but the present invention may adopt various fixing methods without being limited to the structure. Therefore, various modifications or a structure easily derived based upon the present invention should be embraced within the scope of the present invention.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A system for testing a distortion of a liquid crystal display (LCD) device, comprising: a base;
a fixing unit that fixes the LCD device, the fixing unit being rotated on one end side thereof so that a display face of the LCD device is vertical to a ground;
a laser sensor on the base at front side or rear side of the LCD device that irradiates light to the LCD device to measure a displacement of an internal component thereof;
a conveyer at a front side or rear side of the LCD device, the laser sensor being mounted to the conveyor and movable relative to the LCD device during a testing of the distortion of the LCD device; and
a controller that detects a position of an internal component of the LCD device based upon information input by the laser sensor, and compares the detected position with a preset position of the corresponding internal component to determine a distortion of the component,
wherein the light from the laser sensor is reflected from the internal component and then incident to the laser sensor to detect a position of the internal component,
wherein the LCD device, the fixing unit, the laser sensor and the conveyer are disposed within a chamber in which a temperature and a humidity are varying to test LCD device in environments of various temperature and humidity,
wherein the LCD device has a display region extended in x and y directions and a thickness in the z-direction and the laser sensor is conveyed and continuously moved in the x and y directions at the front side or rear side of LCD device to scan the display region of the LCD device in x and y directions by the conveyer during the testing of the distortion of the LCD device,
wherein the laser sensor comprises a non-transmission type laser sensor, wherein light emitted from the non-transmission type laser sensor is irradiated into the LCD device via a window in a lower cover.

2. The system of claim 1, wherein the laser sensor comprises a transmission type laser sensor.

3. The system of claim 1, further comprising an angle adjusting unit that adjusts an angle between the fixing unit and the ground to adjust an installation angle of the LCD device from the ground.

4. The system of claim 1, wherein the conveyer includes:
a frame installed at the base;
a pair of first guides installed at upper and lower end portions of the frame in the x-direction to be parallel for each other;
a pair of first linear guides at the pair of first guides to be moving along the first guides in the x-direction, respectively;
a second guide of which both end portions are coupled with the pair of first linear guides in the y-direction; and
a second linear guide at the second guide to be moving along the second guide in the y-direction,
wherein the laser sensor is moving in the x and y-directions as the first liner guide is moving along the first guides and the second liner guide is moving along the second guide.

5. The system of claim 1, wherein the controller includes,
a storing unit that stores a preset position value of a component and a position difference preset value;
a position detector that detects a position of a component measured based upon a measurement value when the measurement value is input from the laser sensor; and
a distortion determining unit that compares the detected position by the position detector with a preset position of the corresponding component stored in the storing unit to calculate a position difference value therebetween to determine a distortion of the component based upon the position difference value.

6. The system of claim 5, wherein the controller includes a displaying unit that displays the position of the component detected by the position detector and a degree of the distortion of the component determined by the distortion determining unit.

* * * * *